United States Patent
Wang et al.

(10) Patent No.: US 9,775,035 B2
(45) Date of Patent: Sep. 26, 2017

(54) ARCHITECTURE AND APPARATUS FOR CONTROLLER SECURE MESSAGE PROCESSING

(71) Applicant: GM GLOBAL TECHNOLOGY OPERATIONS LLC, Detroit, MI (US)

(72) Inventors: Shige Wang, Northville, MI (US); Stephen G. Lusko, Warren, MI (US)

(73) Assignee: GM Global Technology Operations LLC, Detroit, MI (US)

(*) Notice: Subject to any disclaimer, the term of this patent is extended or adjusted under 35 U.S.C. 154(b) by 178 days.

(21) Appl. No.: 14/853,266

(22) Filed: Sep. 14, 2015

(65) Prior Publication Data

US 2017/0078878 A1 Mar. 16, 2017

(51) Int. Cl.
| | | |
|---|---|---|
| *H04L 29/06* | (2006.01) | |
| *H04W 12/06* | (2009.01) | |
| *H04L 12/58* | (2006.01) | |
| *H04L 29/08* | (2006.01) | |
| *H04L 12/40* | (2006.01) | |

(52) U.S. Cl.
CPC .............. *H04W 12/06* (2013.01); *H04L 51/26* (2013.01); *H04L 63/08* (2013.01); *H04L 67/12* (2013.01); *H04L 2012/40215* (2013.01)

(58) Field of Classification Search
CPC .................. H04W 12/06; H04L 51/26; H04L 2012/40215; H04L 63/08
USPC ............................................................ 726/3
See application file for complete search history.

(56) References Cited

U.S. PATENT DOCUMENTS

| | | | | |
|---|---|---|---|---|
| 6,801,543 B1* | 10/2004 | Ployer | ................... | H04J 3/1682 370/322 |
| 2011/0103232 A1* | 5/2011 | Sood | ....................... | H04L 63/20 370/241 |
| 2014/0208394 A1* | 7/2014 | Goodwin | .............. | H04L 63/102 726/4 |

OTHER PUBLICATIONS

Nair, Govindan, et al. "IEEE 802.16 Medium Access Control and Service Provisioning." Intel Technology Journal 8.3 (2004).*
Erradi, Abdelkarim, Srinivas Padmanabhuni, and Niranjan Varadharajan. "Differential QoS support in web services management." Web Services, 2006. ICWS'06. International Conference on. IEEE, 2006.*

* cited by examiner

*Primary Examiner* — Syed Zaidi
(74) *Attorney, Agent, or Firm* — Quinn IP Law

(57) ABSTRACT

A secure messaging communication system. A communication bus communicates messages between transmitting nodes. A secure hardware engine of a controller authenticates messages from requesting entities. A processor of the controller initially receives messages from the requesting entities. The processor includes a message request queue prioritizing received messages. The processor communicates a prioritized message from the request queue and associated authentication information to the secure hardware engine. The secure hardware engine authenticates the messages in response to receiving the prioritized messages and associated authentication information from the processor. The secure hardware engine communicates the authenticated messages to the processor for storage in a results queue.

16 Claims, 7 Drawing Sheets

ARCHITECTURE AND APPARATUS FOR CONTROLLER SECURE MESSAGE PROCESSING

BACKGROUND OF INVENTION

An embodiment relates to in-vehicle messaging.

Controller-area network (CAN) is a vehicle bus standard that allows electronic control units (ECUs) and other devices to communicate with one another without a central or host computer. Vehicle systems and subsystems, as well as other types of non-automotive systems including trains, planes, and ships, have numerous ECUs that receive data from sensing devices and communicate to other ECUs of the vehicle.

The CAN system is an asynchronous broadcast serial bus which allows messages to be communicated serially. Therefore, messages between ECUs when transmitted are not necessarily transmitted immediately over the CAN bus when a message is generated. If the CAN bus is free, the message is instantly transmitted. If more than one message is transmitted, the more dominant message is transmitted. This is known as an arbitration process. A CAN message with a highest priority typically will dominate the arbitration and a message transmitting at the lower priority will sense this and wait.

Despite messages being transmitted within a vehicle, there still needs to be secure messaging to make sure that systems are not compromised and malicious messages are not transmitted within the system which could cause safety concerns. For example, with the introduction of automated cruise control and other automated driving operations, security must still be maintained with respect to communicating ECUs, otherwise a malicious node could compromise the system and cause unintended vehicle operations.

SUMMARY OF INVENTION

An advantage of an embodiment is the elimination of centralized processing or event-driven non-prioritized processing of secure messages by utilizing a technique that includes decoupled, parallel message authentication on a secure hardware engine asynchronously to the time-critical applications on regular processors of a controller. The apparatus and techniques herein provides an architecture that decouples the secure message processing request on a processor and the secure message processing on the secure hardware engine by utilizing a request-mark-sweep with callback functionality. The embodiments as described utilize two queues to reduce contention between different secure message requests from an application and a secure hardware engine that processes the authenticated messages. A processor that communicates the messages to and from the secure hardware engine includes a request allocation table that dynamically records a state of the message and its status and a message authentication lookup table that correlates with the request allocation table for providing authentication information relating to the requesting entity transmitting the request message. The infrastructure implements asynchronous processing utilizing a priority queue management service for maintaining prioritization of the requests in the queues, and a request-mark-sweep function with callback service for processing messages to and from the secure hardware engine. The system and techniques further provide herein a non-blocking method to process messages to meet the real time constraints of the system. This also allows the controller processor to execute other functionality while the secure hardware engine authenticates the messages, thus improves the overall system throughputs.

An embodiment contemplates a secure messaging communication system. A communication bus for communicating messages between transmitting nodes. A secure hardware engine of a controller authenticates messages from requesting entities. A processor of the controller initially receives messages from the requesting entities. The processor includes a message request queue prioritizing received messages. The processor communicates a prioritized message from the request queue and associated authentication information to the secure hardware engine. The secure hardware engine authenticates the messages in response to receiving the prioritized messages and associated authentication information from the processor. The secure hardware engine communicates the authenticated messages to the processor for storage in a results queue.

An embodiment contemplates a method for secure message processing within a communication bus system. Messages are communicated on a communication bus between transmitting nodes. Messages are received in a processor of the controller from a respective entity. Messages are maintained in a request queue in prioritizing order. A request allocation table is accessed. The request allocation table stores information relating to the messages. Each entry in the request allocation table is associated with an entry in a message authentication lookup table identifying authentication information associated with a respective entity transmitting the respective message. A message having a highest priority in the request queue is received in a secure hardware engine. Authentication information is communicated to the secure hardware engine from the processor. The message is authenticated in response to the receiving the messages and associated authentication information from the processor. The authenticated message is communicated from the secure hardware engine to the processor. The authenticated message is stored in a result queue in the processor until a callback function is actuated.

DETAILED DESCRIPTION

Figure 1:
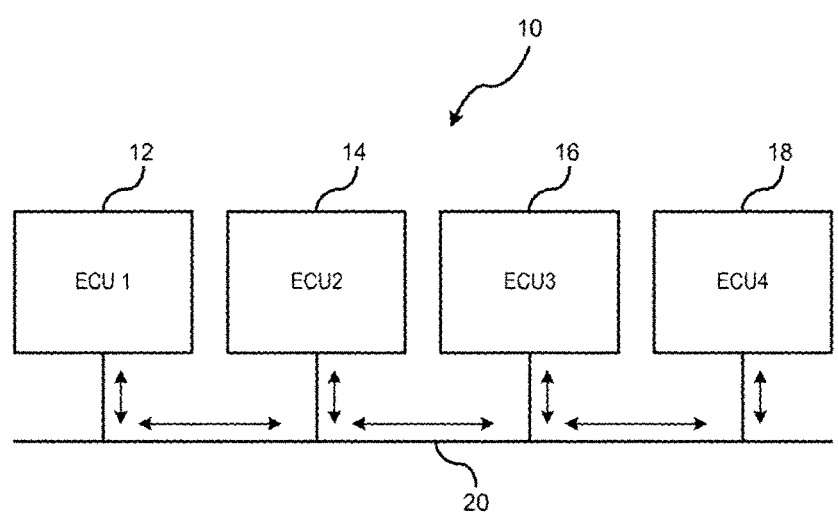
FIG. 1 is a block diagram of an exemplary LAN network communication system.

There is shown in FIG. 1, an exemplary vehicle LAN network communication system 10. The LAN network communication system 10 includes a plurality of electronic control units (ECUs) 12-18 coupled to at least one communication bus 20 which allows the ECUs to communicate with one another. The bus utilizes a controller area network (CAN) communication protocol; however, other types of communication protocol can be used.

Each of the plurality of ECUs 12-18 are coupled to one or more sensors, actuators, or control devices (e.g., application components). The application components are not directly connected to the communication bus 19, but are coupled through the respective ECUs. The application components could be software components in the ECUs. A single control feature may span across multiple application components and involve control messages from source to a destination ECU. It is understood that such systems are known in the art and that ECUs, application devices, controllers, and transceivers are referred to as nodes and the details of their composition will not be discussed in detail herein.

Figure 2:
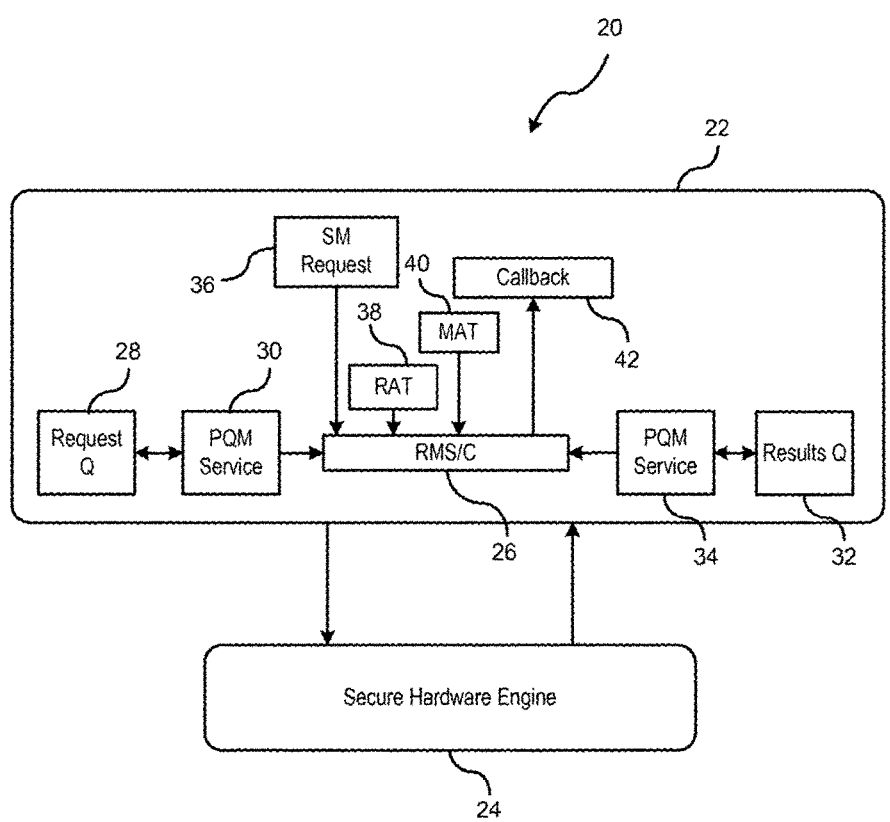
FIG. 2 is an exemplary block diagram of a controller.

FIG. 2 is a block diagram of a respective controller. The controller may include, but is not limited to, battery controller, engine controller, chassis controller. The controller as illustrated identifies the configuration and part of the architecture that each respective controller will have to execute the techniques described herein. It should also be understood that the invention as described herein is not limited to vehicles but may also include trains, ships, planes, or other automotive or non-automotive apparatuses.

FIG. 2 illustrates a controller 20 that includes a processor 22 and secure hardware engine 24. The secure hardware engine 24 receives request messages from the processor 22 and authenticates the request secure message. While the request secure message is being authenticated by the secure hardware engine 24, the processor may continue perform other work and process other messages accordingly. For example, if another controller transmits a secure message to provide data to the controller 20, the processor 22 enters the message as a request secure message in the request queue 28. When secure hardware engine 24 is available, the secure hardware engine 24 validates the request secure message while the processor 22 may add other secure message in the request queue 28 or executes functions such as callback function. The secure hardware engine 24 is a hardware device that authenticates and validates secure messages.

The processor 22 includes a request-mark-sweep and callback module (RMS/C) 26, a request queue 28, a priority queue management service (PQM) module 30 for request queue 28 management, a result queue 32 for processed messages, a (PQM) module 34 for result queue 32 management, a secure message request module 36 for applications to request secure message processing, a request allocation table (RAT) 38, a message authentication lookup table (MAT) 40, and callback function module 42.

The RMS/C 26 is a main component of the processor that communicates with the secure hardware engine 24 for providing request messages and authenticated messages therebetween. The RMS/C 26 further coordinates the authentication process for messages transmitted to the secure hardware engine 24.

Messages sent by applications or other hardware devices or software modules within the vehicle are received by the processor 22 and stored in the request queue 28. Each transmitting entity is assigned a level of priority, and therefore, messages stored within the request queue 28 are assigned to a priority level based on the priority of the requesting entity transmitting the message. The request queue 28 is protected by the PQM service 30 to allow concurrent access of a single reader and multiple writers.

Figure 3:
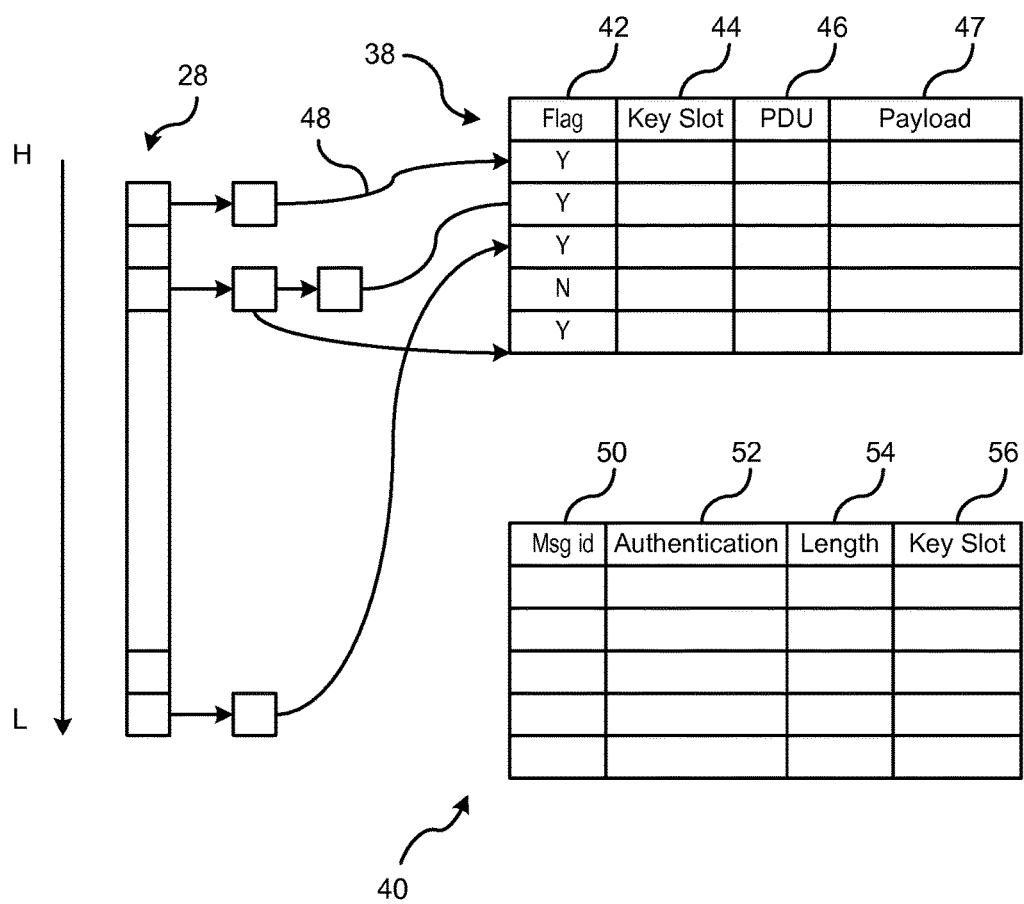
FIG. 3 illustrates architecture structure for a request queue, request allocation table, and message authentication lookup table.

The request queue 28 is priority queue structure that is maintained by the priority queue maintenance service module 30. FIG. 3 illustrates the request queue 28 and associated priority queue structure as set forth by the priority queue maintenance service module 30. Messages are ordered in a priority from highest to lowest. That is, each entry level in the vertical direction represents a respective priority. It should be understood that the priority ranking is exemplary and that other structures may be utilized. If more than one message is received in the request queue 28 that have a same priority level, then each of the respective messages share a same priority level (shown horizontally). Each of the messages in a same priority level will not be distinguishable from one another in regards to prioritization. Messages in a same priority level will be selected for processing either randomly or by other-techniques such as the first-in-first-out for multiple messages of a same priority. Access to the queues may be executed by parallel access to different entries (i.e., messages with different priorities) or access to a same priority using a lock-free protocol.

In response to messages being added to the request queue 28, the RAT 38 is updated. Each request within the request queue points to an entry in the RAT 38. To create the correspondence between a request and its entry in the RAT 38, an open entry within the RAT 38 is identified when the SM request 36 submits a request to RMS/C 26. An allocation flag field 40 indicates whether a respective entry is being utilized or whether the respective entry is open. Pertinent information such as key slot 42, protocol data unit (PDU) 44, and payload 46 are maintained for an associated entry. PDU 44 specifies a protocol-specific data in a data transmission. For example, in a CAN system, PDU 44 will include a CAN ID and a data length code. The information such as the message identifier encoded in CAN ID contained in PDU 44 is used to determine the entry identified by the message identifier in MAT 40. Note this is exemplary and other approach such as direct usage of message identifier or encoding the identifier in other format can be used to create the correspondence.

Pointers represented generally by 48 identify where the each respective request is located in the RAT 38. In addition, the pointer 48 will be maintained when moving entry from the request queue 28 to the result queue 32.

The MAT 40, as illustrated in FIG. 3, is a table that is statically configured at a design time and is stored as calibration values. The information stored in the MAT 40 is used for secure message authentication and ensures a consistent process of authentication and validation across different controllers. For each transmitting entity in the vehicle, each entity will have an associated identifier. This identifier is transmitted as part of a message (e.g., in a header of the message) that identifies who the transmitting entity is so that each receiving entity will know the source of the message, the priority level that should be associated with the message, and the authentication credentials for verifying the message. The MAT 40 stores information that includes, but is not limited to, a message identifier 50 which identifies the transmitting entity, the authentication scheme 52, message length 54, and key slot 56. This information will be utilized to assist in authenticating messages between the processor and the secure hardware engine.

Referring again to FIG. 2, when the request queue 28 is not empty, the RMS/C 26 coordinates insertion and retrieval of a request message from the request queue 28 and the necessary authentication information that will be required by the secure hardware engine 24 for authenticating or validating the message. A secure message request module 36, invoked by requesting entity, will use the request service of the RMS/C 26 to add a request message to the request queue 28. The request service of the RMS/C 26 identifies an open entry in the RAT 38, records the message information, and inserts the message in the request queue 28 with the pointers 48 as described earlier. The RMS/C 26 will further access the MAT 40 to obtain the necessary authentication information that will be needed to authenticate the message with secure hardware engine 24. The mark service in the RMS/C 26 communicates the request in the authenticating information to the secure hardware engine 24 when the secure hardware engine 24 becomes available. The message is then marked as being processed and is removed from the request queue 28. After the secure hardware engine 24 authenticates the request secure message, the authentication result will be transmitted to the RMS/C 26.

In response to receiving the authentication result from the secure hardware engine 24, the mark service of the RMS/C 26 will place the authenticated secure message into the result queue 34 using the PQM service 32. The sweep service of the RMS/C is invoked according to predefined policy, for example at a predefined time or periodically or upon an occurrence of an event, to pull the authenticated messages from the result queue 34 and call their corresponding callback function 42. Each callback function 42 is defined by the requesting entity to complete the process of a secure message. The sweep service of the RMS/C removes the message from the result queue 34 after the callback function 42 is invoked.

Figure 4:
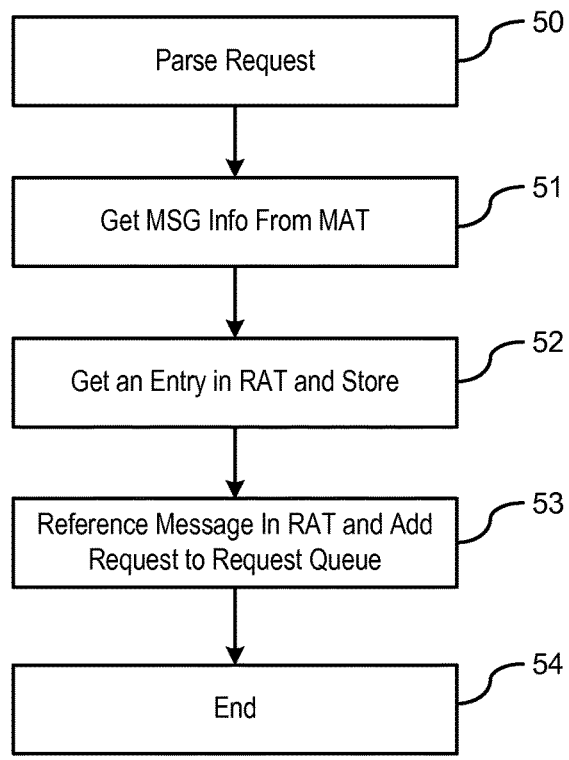
FIG. 4 is a flowchart for a request service routine.

FIGS. 4-11 illustrate process flowcharts that describes the process of the services described above. FIG. 4 illustrates the request service of the RMS/C. In block 50, messages in the request queue are parsed, and respective messages selected.

In step 51, the identification associated request message is identified in the MAT and message information is obtained for authentication purposes.

In step 52, an open entry in the RAT is identified and the request message is stored in the open entry. The entry is thereafter flagged as being allocated.

In step 53, the message is prioritized and is added to the request queue according to its priority level.

In step 54, the routine ends.

Figure 5:
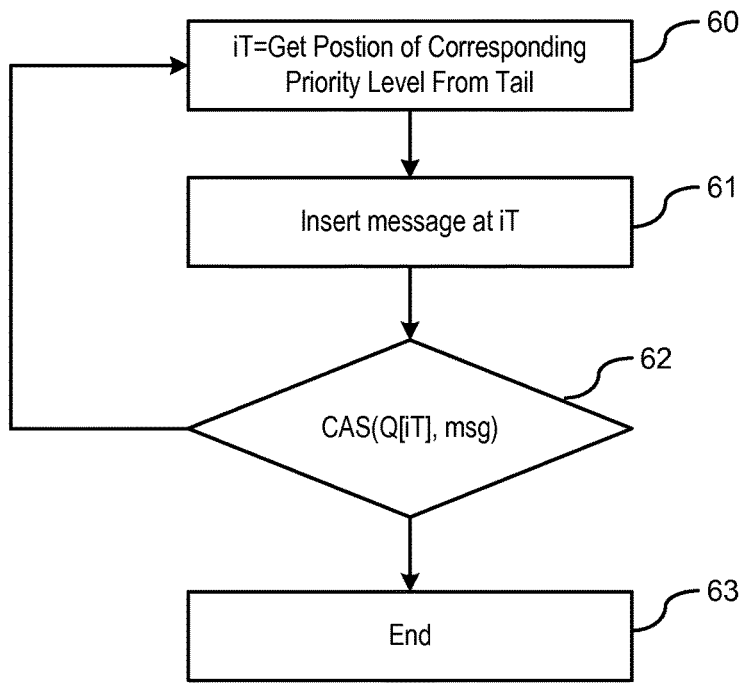
FIG. 5 is a flowchart for an enqueuing service routine.

FIG. 5 illustrates an enqueuing process for the request queue.

In step 60, the entry for the message's priority level in the request queue is identified.

In step 61, a new request is inserted at its priority level entry.

In step 62, a lock-free synchronization is used to synchronize the concurrent access of the queue from multiple entities. A compare-and-swap is used as an exemplary implementation. If the determination is made that the data is consistent, then the routine terminates. If the determination is made that the data is not consistent, then the routine returns to step 60.

In step 63, the routine ends.

Figure 6:
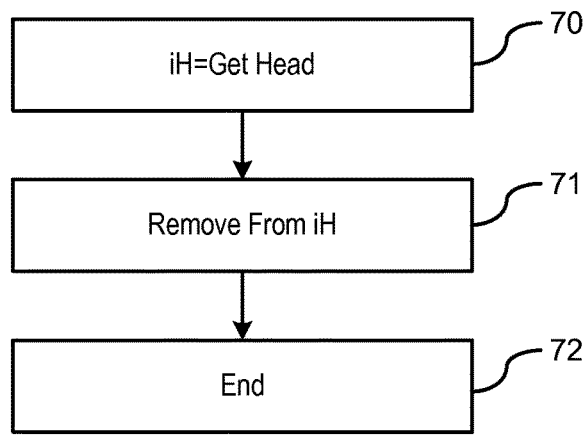
FIG. 6 is a flowchart for a dequeuing service routine.

FIG. 6 illustrates a dequeuing process for removing a respective request from the request queue.

In step 70, the message having the highest priority in the request queue is identified.

In step 71, in response to identifying the highest priority message, the respective message is removed from the request queue.

In step 73, the routine ends.

Figure 7:
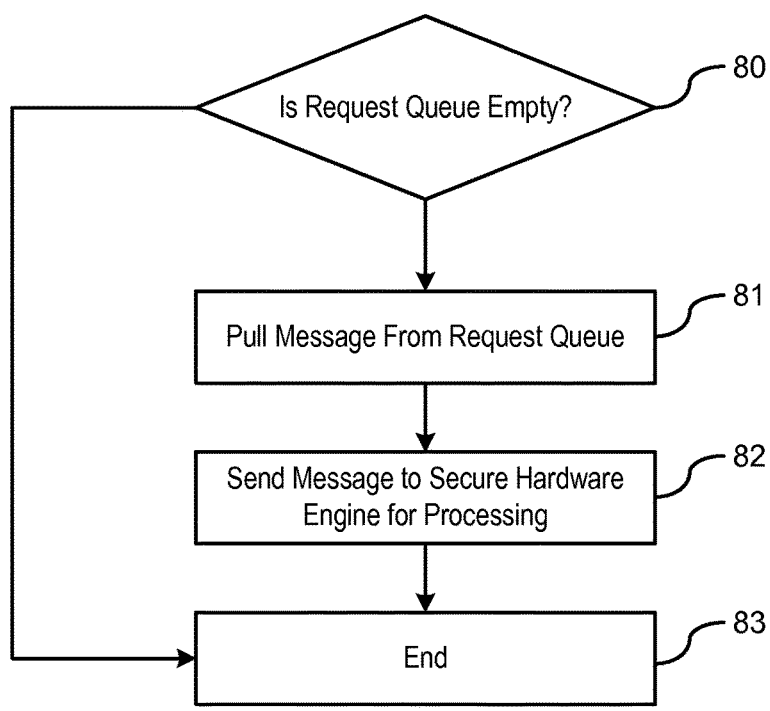
FIG. 7 is a flowchart for a mark service routine.

FIG. 7 represents the Mark Service of the RMS/C that retrieves the request and sends all information to the secure hardware engine.

In step 80, a determination is made whether the request queue is empty. If the request queue is empty, then the routine is terminated and waits for a next Mark service request. If the request queue is not empty, then the routine proceeds to step 81.

In step 81, the message having the highest priority message is pulled from the request queue. This may include pulling from the highest priority message relative to all the messages in the queue, or if multiple messages are present for a same level priority, then a message is chosen among other messages of the same priority according to a predefined policy such as random selection or first-in-first-out.

In step 82, the selected message is sent to the secure hardware engine for processing. Authentication information from the MAT is obtained and provided to the secure hardware engine for authenticating the message. The corresponding entry in RAT may also be updated.

In step 83, the routine ends.

Figure 8:
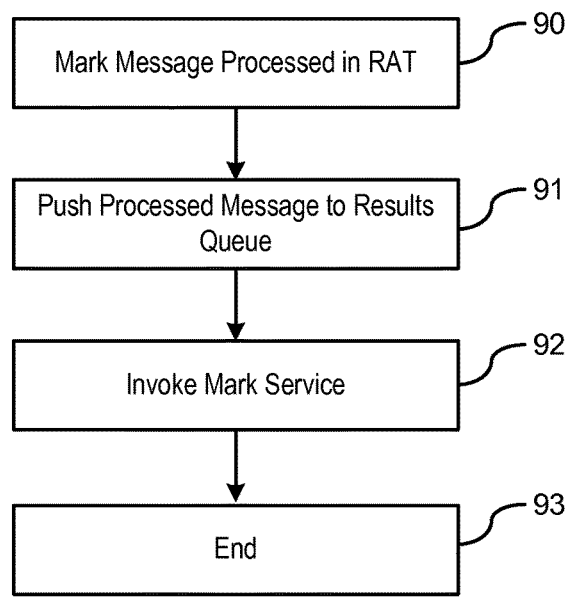
FIG. 8 is a flowchart for an interrupt service routine.

FIG. 8 represents the Mark Service process flow when secure hardware engine completes a message processing. This portion of the Mark Service is an interrupt service routine triggered by hardware and is a very short and brief operation since each of the various competing devices on the controller need to share the secure hardware engine. In summary, when the secure hardware engine completes an operation, an interrupt it triggered where a determination is made whether more messages are present in the queue for invoking the mark service again.

In step 90, the entry of RAT corresponding to the message authenticated by the secure hardware engine is updated.

In step 91, upon completion of the message processing by the secure hardware engine, the process message is pushed to the result queue.

In step 92, the process jumps to the Mark service in FIG. 7 and exit the interrupt service routine. If additional messages are waiting in the request queue, then the mark service in FIG. 7 continues to send the request message to secure hardware engine for processing.

Figure 9:
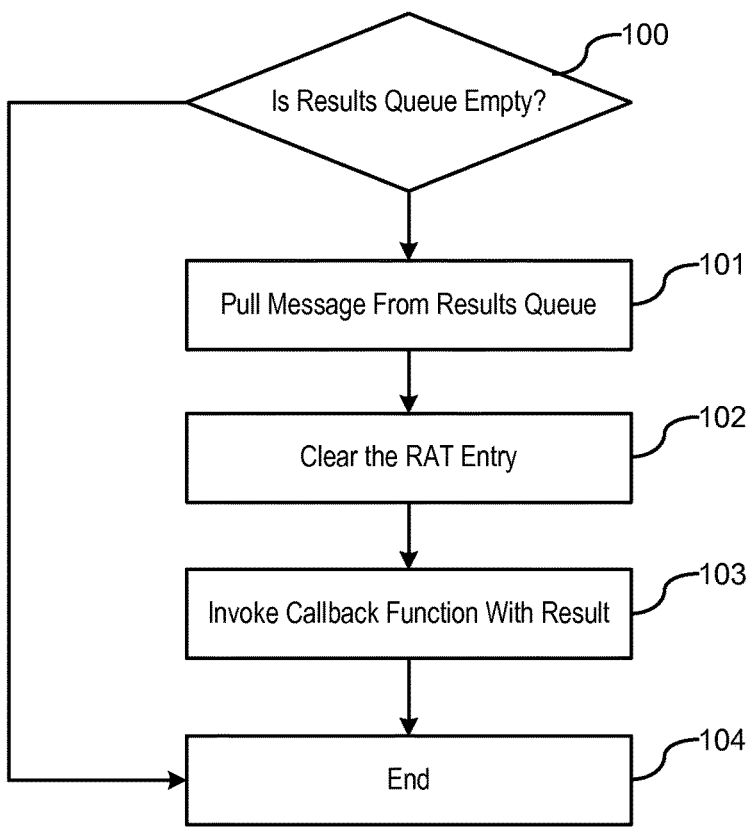
FIG. 9 is a flowchart for a sweep service routine.

FIG. 9 describes a sweep service that is invoked by a predefined trigger or event (e.g., periodic).

In block 100, a determination is made whether the result queue is empty. If the result queue is empty, then the routine ends. If the result queue is not empty, then the routine proceeds to step 101.

In block 101, a respective message is pulled from the result queue.

In block 102, in response to pulling the respective message from the result queue, the entry that the respective message occupied in the RAT is cleared to make room for other incoming requests.

In block 103, the result message with the highest priority is removed from the result queue and a callback function is invoked with in regards to the respective message.

In step 104, the routine ends.

Figure 10:
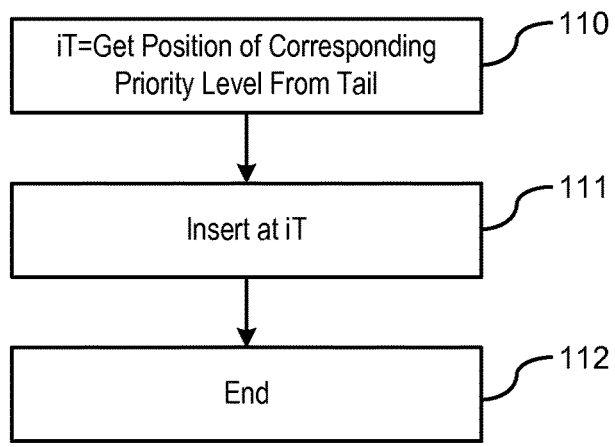
FIG. 10 is a flowchart for an enqueuing service routine.

FIG. 10 illustrates an enqueuing process for the result queue.

In block 110, the entry for the message's priority level in the result queue is identified.

In step 111, a request that is completed processing by the secure engine module is inserted at the identified priority level entry.

In step 112, the routine ends.

Figure 11:
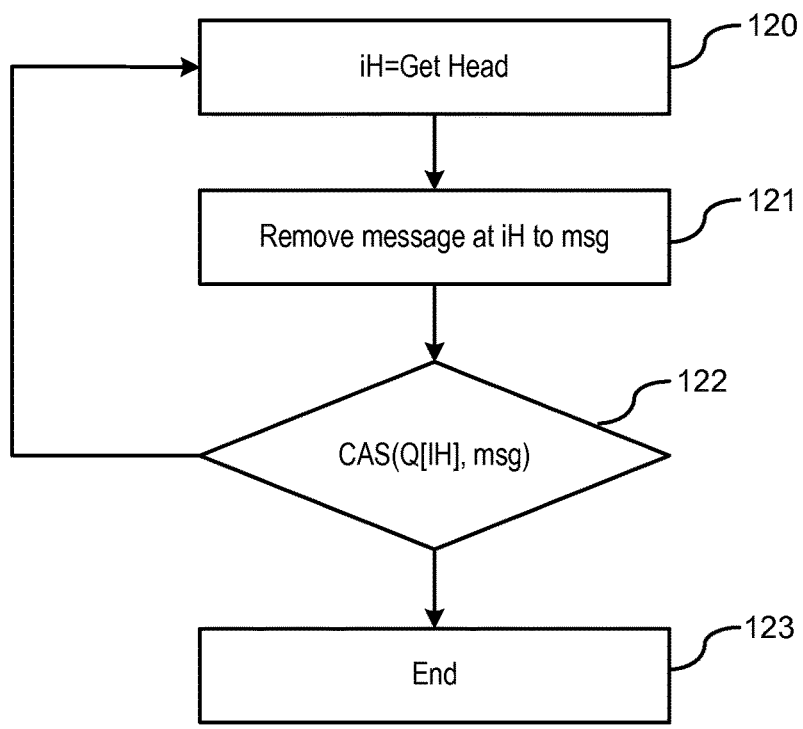
FIG. 11 is a flowchart for a dequeuing service routine.

FIG. 11 illustrates a dequeuing process for the result queue.

In step 120, the first result entry in the request queue is identified.

In step 121, a new result entry is deleted at the highest priority level entry.

In step 122, a lock-free synchronization is used to synchronize the concurrent access of the queue from multiple entities. A compare-and-swap is used as an exemplary implementation. If the determination is made that the data is consistent, then the routine terminates. If the determination is made that the data is not consistent, then the routine returns to step 120.

In step 123, the routine ends.

While certain embodiments of the present invention have been described in detail, those familiar with the art to which this invention relates will recognize various alternative designs and embodiments for practicing the invention as defined by the following claims.

What is claimed is:

1. A secure messaging communication system comprising:
   a communication bus configured to communicate messages between transmitting nodes; and
   a controller having a secure hardware engine configured to authenticate messages from requesting entities, and further having a processor configured to initially receive the messages from the requesting entities, the processor including a message request queue operable for prioritizing the received messages, wherein the processor is configured to communicate a prioritized message from the message request queue and associated authentication information to the secure hardware engine, and wherein the processor further includes a sweep service module that identifies a processed message in a results queue of the processor at a predefined time;
   wherein the secure hardware engine is further configured to authenticate the messages from the requesting entities in response to receiving the prioritized messages and associated authentication information from the processor, and to communicate the authenticated messages to the processor for storage in the results queue, and wherein the sweep service module is further configured to execute a callback function notifying the requesting entities of completion of authenticating the message.

2. The system of claim 1 wherein the processor further includes a request allocation table identifying each message in the request entry queue, the request allocation table including information associated with the message for processing the message, wherein the request allocation table is configured to maintain a comprehensive listing of each message communicated to the processor by the transmitting nodes.

3. The system of claim 2 wherein the request allocation table includes in allocated flag field identifying an availability of each respective entry in the request entry queue.

4. The system of claim 2 wherein each entry in the request entry queue includes a pointer that associates each entry in the request entry queue to a respective entry in the request allocation table.

5. The system of claim 4 wherein the processor further includes a priority queue maintenance service module for maintaining a priority structure of messages within the request entry queue.

6. The system of claim 5 wherein the priority queue maintenance service module is configured to maintain the priority queue structure.

7. The system of claim 6 wherein the priority queue maintenance service module is configured to maintain the priority queue structure by ordering the messages from a highest priority to a lowest priority among the respective messages in the request entry queue, wherein two respective message in the request entry queue having a same priority are set at the same priority level.

8. The system of claim 2 wherein the processor further includes a message authentication lookup table, the message authentication lookup table including a plurality of identifiers that identify request entities, wherein each identifier includes the associated authentication information to authenticate a respective message from a respective one of the requesting entities when transmitting to the secure hardware engine.

9. The system of claim 8 wherein the information stored in the message authentication lookup table is predetermined.

10. The system of claim 8 wherein the processor includes a request service module configured to add the message in the request entry queue, and to obtain information associated with the message from the request allocation table and the message authentication lookup table.

11. The system of claim 10 wherein the processor includes a mark service function module configured to determine whether the request entry queue is empty, and wherein the processor is operable for selecting a message having a highest priority among the request entries in the request entry queue to send to the secure hardware engine for processing in response to the request entry queue not being empty.

12. The system of claim 11 wherein the processor includes a mark interrupt service request module configured to transmit the result from the secure hardware engine to the results queue.

13. The system of claim 12 wherein the processor enables the mark interrupt service module in response to the secure hardware engine completing processing of a previous request message.

14. The system of claim 1 wherein each entry in the request entry queue includes a pointer that identifies each request in the request allocation table, and wherein the pointer is maintained in the request allocation table as each authenticated message is moved to the results queue.

15. The system of claim 1 wherein the processor includes a priority queue maintenance service module configured to maintain a priority structure of request entries within the request entry queue.

16. A secure messaging communication system comprising:
   a communication bus configured to communicate messages between transmitting nodes; and
   a controller having a processor configured to receive and prioritize the messages from requesting entities, and a secure hardware engine configured to authenticate the prioritized messages in response to receiving the messages and associated authentication information from the processor, the processor including:
      a results queue configured to store the authenticated prioritized messages;
      a message request queue configured to prioritize the received messages, wherein the processor is configured to communicate the prioritized messages from the message request queue and associated authentication information to the secure hardware engine;
      a message authentication lookup table including a plurality of identifiers that identify the requesting entities, wherein each of the identifiers includes the associated authentication information; and
      a request service module operable for obtaining the associated authentication information from a request allocation table and the message authentication lookup table;

wherein the secure hardware engine is configured to communicate the authenticated prioritized messages to the processor for storage in the results queue.

* * * * *